(12) United States Patent
Piccirilli et al.

(10) Patent No.: US 8,426,524 B2
(45) Date of Patent: *Apr. 23, 2013

(54) ELASTOMERIC BLEND FOR VEHICLE TIMING BELT

(75) Inventors: Mauro Piccirilli, Isernia (IT); Thomas George Burrowes, North Canton, OH (US)

(73) Assignee: Veyance Technologies, Inc, Fairlawn, OH (US)

( * ) Notice: Subject to any disclaimer, the term of this patent is extended or adjusted under 35 U.S.C. 154(b) by 666 days.

This patent is subject to a terminal disclaimer.

(21) Appl. No.: 11/635,132

(22) Filed: Dec. 6, 2006
(Under 37 CFR 1.47)

(65) Prior Publication Data

US 2008/0139709 A1   Jun. 12, 2008

(51) Int. Cl.
*C08L 9/00* (2006.01)
*C08L 9/02* (2006.01)
*C08L 47/00* (2006.01)

(52) U.S. Cl.
USPC ........... 525/234; 525/232; 525/233; 525/191; 474/202

(58) Field of Classification Search .................. 525/238, 525/232, 233, 234, 191; 474/202
See application file for complete search history.

(56) References Cited

U.S. PATENT DOCUMENTS

| | | | | |
|---|---|---|---|---|
| 3,738,187 A * | 6/1973 | Hisserich | | 474/148 |
| 4,721,496 A * | 1/1988 | Yokoyama et al. | | 474/205 |
| 5,234,387 A | 8/1993 | Fujiwara et al. | | |
| 5,266,640 A * | 11/1993 | Karg et al. | | 525/234 |
| 5,683,819 A * | 11/1997 | Mori et al. | | 428/500 |
| 5,860,883 A | 1/1999 | Jonen et al. | | |
| 6,187,867 B1 * | 2/2001 | Rau et al. | | 525/221 |
| 6,214,922 B1 | 4/2001 | Campomizzi | | |
| 6,358,171 B1 * | 3/2002 | Whitfield | | 474/266 |
| 6,435,217 B1 | 8/2002 | Bertero et al. | | |
| 6,451,902 B2 | 9/2002 | Campomizzi | | |
| 6,489,385 B1 * | 12/2002 | Fujii et al. | | 524/186 |
| 6,669,591 B1 | 12/2003 | Brinkman et al. | | |
| 6,695,734 B2 * | 2/2004 | Hedberg et al. | | 474/263 |
| 6,770,004 B1 | 8/2004 | Lofgren et al. | | |
| 6,794,452 B2 * | 9/2004 | von Hellens | | 525/195 |
| 7,737,225 B1 * | 6/2010 | Touchet et al. | | 525/368 |
| 2002/0193524 A1 * | 12/2002 | Harvey et al. | | 525/192 |
| 2003/0050143 A1 * | 3/2003 | Gregg et al. | | 474/263 |
| 2005/0101737 A1 * | 5/2005 | Pazur et al. | | 525/192 |
| 2006/0276353 A1 * | 12/2006 | Irving et al. | | 508/363 |

FOREIGN PATENT DOCUMENTS

| | | |
|---|---|---|
| EP | 1 111 003 | 6/2001 |
| EP | 1 491 583 | 12/2004 |
| JP | 07 208 556 | 8/1995 |

OTHER PUBLICATIONS

Lanxess—Therban advertising flyer.*
Hydogenated Nitrile Rubber, www.azom.com, Dr. Hans Magg, Materials World, vol. 6 No. 8 pp. 485-487, Aug. 1998.

* cited by examiner

*Primary Examiner* — Irina Krylova
(74) *Attorney, Agent, or Firm* — Alvin T. Rockhill; Kathleen K. Bowers

(57) ABSTRACT

A reduced cost elastomeric blend suitable for use in vehicle timing belts and other applications constructed with elastomeric portions having a high HNBR concentration. The blends comprise from about 50 to less than 100 phr of HNBR and from about 0.1 to about 50 phr of lower cost diluent unsaturated nitrile rubber with from about 0.1 to about 30 phr of a heat resistant additive, which may be THERBAN HT. The elastomeric blends may be cured with a peroxide/co-agent cure system. The elastomeric blends may be mixed by a Y-mix method to improve ozone resistance. A timing belt constructed of the elastomeric blend is also taught.

11 Claims, 1 Drawing Sheet

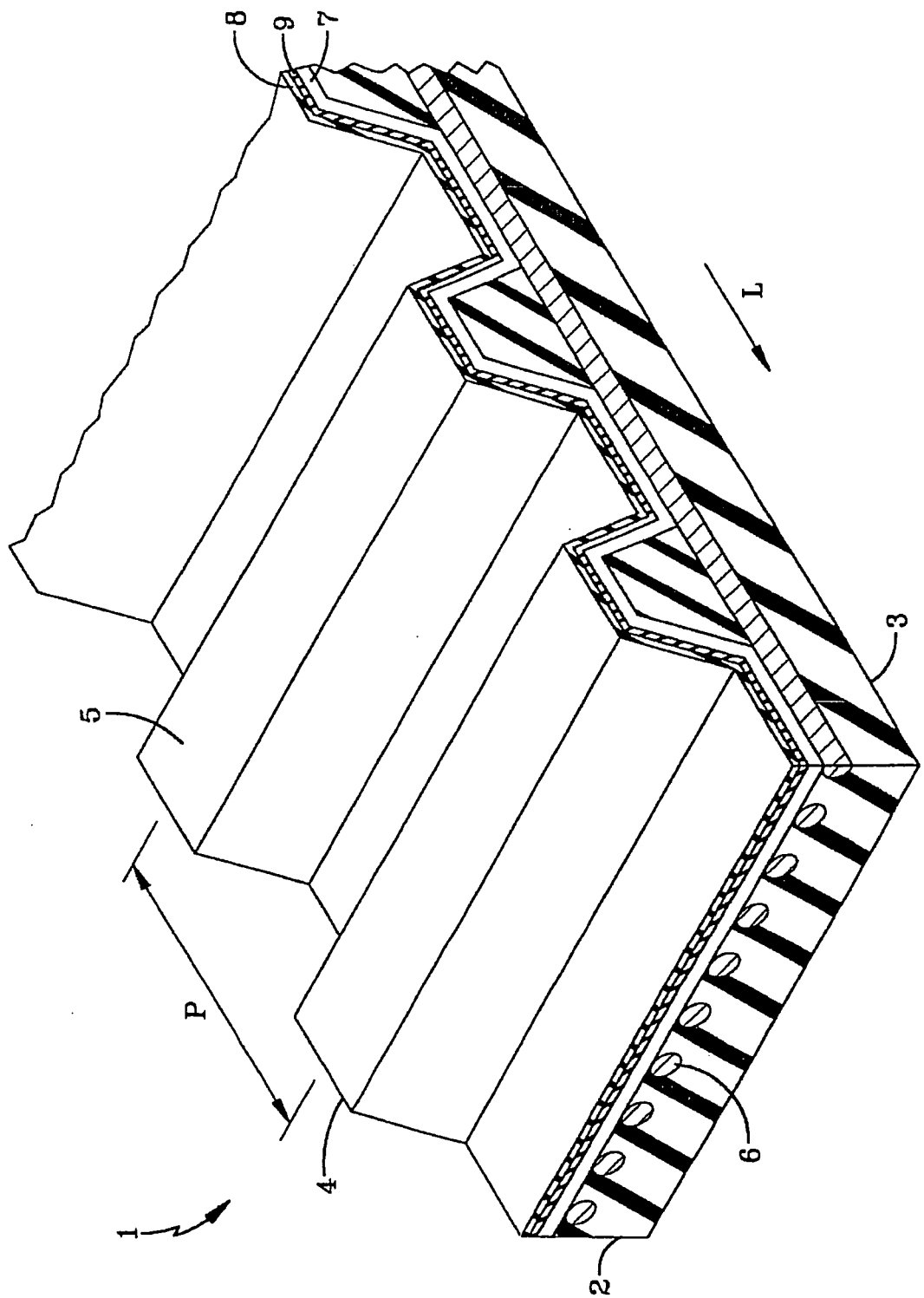

ELASTOMERIC BLEND FOR VEHICLE TIMING BELT

I. BACKGROUND OF THE INVENTION

A. Field of Invention

This invention pertains to the art of elastomeric blends suitable for use in vehicle timing belts and other apparatuses that may be constructed with elastomeric compositions.

B. Description of the Related Art

Hydrogenated nitrile rubber and specifically, hydrogenated acrylonitrile butadiene rubber (HNBR) is becoming a preferred elastomer for use in vehicle timing belts. HNBR has high tensile strength, low permanent set, good abrasion resistance and high elasticity. Further, HNBR demonstrates good stability towards thermal aging and exhibits better properties at low temperatures compared to other suitable heat- and oil-resistant elastomers. Moreover, HNBR has good static and dynamic properties at operation temperatures and good retention of properties under continuous heat exposure. There are several other physical properties of HNBR that make it useful in automotive belt applications, including good viscoelastic properties in HNBR vulcanizates, a wide service temperature range from −40° C. to +150° C., resistance to fluids of various chemical compositions and excellent resistance to strongly alkaline and aggressive fluids.

Though HNBR exhibits excellent material properties for use in timing belts and other similar applications, HNBR is more expensive than conventionally used elastomers, including polychloroprene. Given the considerable expense of using elastomeric compositions containing high proportions of HNBR in timing belt and other similar applications, it is desirable to formulate blends of HNBR with lower cost diluents to reduce the overall cost of the elastomer component. It is known, for example, to blend HNBR with low-cost fillers, such as carbon black or clay. While such HNBR/filler blends address the issue of reduced cost, the material characteristics and physical properties of such blends suffer with increasing concentrations of filler. It is, therefore, desirable to prepare HNBR/diluent blends for use in timing-belt applications and other articles conventionally constructed with high HNBR concentrate elastomeric compounds, which have significantly reduced cost, without an unsuitable reduction in the desirable material properties of the resulting composition, including dynamic properties, abrasion resistance and tensile strength.

II. SUMMARY OF THE INVENTION

The present invention proposes elastomeric blends wherein up to approximately 50 parts by weight of HNBR may be replaced with a suitable, low-cost elastomer diluent, namely unsaturated nitrile rubber, which may be acrylonitrile butadiene rubber (NBR). A free-radical crosslinking reaction using a free-radical promoting material may be used to cure the rubber blends. Further, an anti-degradant system comprising a heat-resistant agent is taught, which may allow suitable HNBR/NBR blends having higher proportions of NBR diluent. Also taught are methods of blending the HNBR and NBR so as to maximize heat and ozone resistance.

According to one aspect of the present invention, an elastomeric blend is provided comprising from about 50 to less than about 100 parts per hundred rubber of HNBR, from about 0.1 to about 50 parts per hundred rubber of NBR, and from about 0.1 to about 20 parts per hundred rubber of a heat-resistant agent, which may be the material sold under the trademark THERBAN HT by Lanxess Corporation.

According to another aspect of the invention, the elastomeric blends are preferably cured using a free-radical promoting material, which may be a peroxide.

According to yet another aspect of the invention, the peroxide may be used in amounts from about 0.1 to about 12 parts per hundred rubber (phr), and in other embodiments, from about 0.5 to about 7 phr.

According to another aspect of the invention, the elastomeric blends may further be cured with a free-radical curing coagent, which may be used in amounts from about 0.1 to about 15 phr, and more preferably from about 2 to about 10 phr.

According to yet a further aspect of the invention, a method of blending an elastomeric blend includes, in a first mix pass, preparing an HNBR non-productive stage comprising from about 50 to less than about 100 phr of hydrogenated nitrile butadiene rubber and from about 0.1 to about 20 parts per hundred rubber of the heat-resistant additive THERBAN HT, in a separate, second mix pass, preparing an NBR non-productive stage comprising from about 0.1 to about 50 phr of unsaturated nitrile rubber, from about 0.1 to about 10 phr of an antiozonant and from about 0.1 to about 15 phr of wax; in a third mix pass, blending the HNBR non-productive stage and the NBR non-productive stage; and in a fourth or final mix pass, adding a curing agent.

Peroxide-cured blends of HNBR and unsaturated nitrile rubber having suitable heat and ozone resistance for use in vehicle timing belts are also taught, as are timing belts constructed from the elastomeric blends.

Still other benefits and advantages of the invention will become apparent to those skilled in the art to which it pertains upon a reading and understanding of the following detailed specification.

III. BRIEF DESCRIPTION OF THE DRAWINGS

Inventive embodiments may take physical form in certain parts and arrangement of parts, a number of embodiments of which will be described in detail in this specification and illustrated in the accompanying drawings that form a part hereof and wherein:

FIG. 1 illustrates a portion of an exemplary timing belt manufactured from inventive embodiments.

IV. DESCRIPTION

Referring now to the drawings wherein the showings are for purposes of illustrating an embodiment of the invention only and not for purposes of limiting the same, FIG. 1 shows exemplary timing belt 1 constructed with elastomeric-blend embodiments. The structure and construction of timing belts is generally well known in the art, and embodiments of such belts are described in, for example, U.S. Pat. No. 6,770,004 to Lofgren, et al.

As illustrated in FIG. 1, timing belt 1 may have belt body 2, having outer surface 3, and inner-facing toothed surface 4. Inner-facing surface 4 may have at least one row of adjacent rows of teeth 5 and when belt 1 is used, inner-facing surface 4 may contact another article (not shown) to drive belt 1 in a manner known in the art. Belt body 2 may be made of a resilient elastomer or elastomer composition and may be reinforced with longitudinal tensile members 6 that lie along belt longitudinal direction L.

Tensile members 6 may be comprised of a cord or plurality of cords having a high elastic modulus. The cord or cords may be made from glass fiber, carbon fiber, steel, polyester, high tenacity rayon, polyamide, aramids or other suitable material.

In automotive applications, the tensile members are typically, but not necessarily, made using glass fibers. Inner-facing toothed surface 4 may be reinforced with abrasion-resistant fabric 7. Belt 1 may further include cover layer 8 and bonding layer 9 between cover layer 8 and fabric layer 7 to assist in adhering cover layer 8 to fabric layer 7.

As noted above, it is known to use a wide variety of elastomers in construction of belt body 2, including, e.g., polychloroprene, polyurethane, HNBR, BR, IIR, IR, SBR, CSM, EPDM, other thermosets, thermoplastic elastomers and other polymer alloys. Inventive embodiments, relate to elastomeric compositions or blends, described in further detail below, comprising HNBR, which are suitable for use in manufacturing belt body 2.

It is further noted that while at least an inventive embodiment is illustrated in FIG. 1, the structure of which is described in U.S. Pat. No. 6,770,004 to Lofgren, et al, it should be understood that other inventive embodiments are not to be limited to this particular embodiment or form as illustrated, but rather the inventive embodiments are applicable to a broad array of belt applications and other articles typically constructed with elastomeric compositions having high proportions of HNBR, where it may be desirable to dilute the HNBR with lower cost diluents without materially, adversely affecting the properties of the overall elastomeric composition.

In another embodiment, there is provided an elastomeric composition having hydrogenated nitrile rubber, unsaturated nitrile rubber, a heat resistant additive, and a peroxide cure system. In one embodiment, the elastomeric composition may have from about 30 to less than 100 parts per hundred parts of rubber (phr), and in another embodiment, about 40 to about 90 phr, and in another embodiment, from about 60 to about 80 phr and in still other embodiments, greater than about 50 to less than 100 phr of hydrogenated nitrile rubber. The elastomeric composition may further comprise from about 0.1 to about 70 phr, and in other embodiments, about 10 to about 60 phr, and in still other embodiments, from about 20 to about 40 phr of unsaturated nitrile rubber. The elastomeric composition may further comprise from about 0.1 to about 30 phr of a heat-resistant additive, though in other embodiments, this amount may be from about 2 to about 20 phr, and in still further embodiments, from about 4 to about 15 phr, and still further embodiments, about 5 to about 10 phr. It is noted that the amount of hydrogenated nitrile rubber, unsaturated nitrile rubber, and heat-resistant additive in the elastomeric composition may vary from the ranges provided. The disclosed ranges are exemplary and illustrative of the level of dilution of hydrogenated nitrile rubber that may be obtained in the inventive embodiment. Unless otherwise stated, the term "about" is deemed to include the upper and tower stated range limits and appropriate equivalents outside the range limits. While HNBR is the preferred hydrogenated nitrile rubber, other hydrogenated nitrile rubbers and blends of hydrogenated nitrile rubbers may be used in the inventive embodiments.

"Hydrogenated nitrile rubber" is to be understood as meaning nitrile rubbers in which the C=C double bonds are partly or completely hydrogenated selectively (i.e. without hydrogenation of the C≡N triple bond). Hydrogenated nitrile rubbers may include those with a degree of hydrogenation, based on the C=C double bond originating from butadiene, of at least 75%. The degree of hydrogenation can be determined by NMR and IR spectroscopy. In an embodiment, the preferred hydrogenated nitrile rubber is hydrogenated acrylonitrile-butadiene rubber ("HNBR").

In certain embodiments, carboxylic acid ester grafted hydrogenated nitrile butadiene, and more preferably, zinc salt carboxylic acid ester grafted hydrogenated nitrile butadiene rubber may also be used. As a non-limiting list of useful zinc salt carboxylic acid ester grafted hydrogenated nitrile butadiene elastomers, the zinc salt carboxylic acid ester grafted hydrogenated nitrile butadiene elastomer can be any of the zinc salt carboxylic acid ester grafted hydrogenated nitrile butadiene elastomers sold by Zeon Chemicals, L.P., Louisville, Ky., under the trademark ZEOFORTE, or under any of the following Zeon Chemical product designations: ZSC 1295, ZSC 2095, ZSC 2195, ZSC 2295, ZSC 2295L, ZSC 2295R, ZSC 2395, and ZSC 2295L having a Mooney viscosity of 60-100, about 9% unsaturation and an acrylonitrile content of about 36%.

"Unsaturated Nitrile rubber" refers to unsaturated acrylonitrile rubbers and includes a copolymer of a conjugated diene and an unsaturated nitrile.

The conjugated diene may be a $C_4$-$C_6$ conjugated diene. Non-limiting examples of useful conjugated dienes may be selected from the group consisting of butadiene, isoprene, piperylene, 2,3-dimethyl butadiene and mixtures thereof. In another embodiment, the $C_4$-$C_6$ conjugated diene may be selected from the group consisting of butadiene, isoprene and mixtures thereof. In yet another embodiment the $C_4$-$C_6$ conjugated diene is butadiene.

The unsaturated nitrile may be a $C_3$-$C_5$ $\alpha,\beta$-unsaturated nitrile. Non-limiting examples of useful $C_3$-$C_5$ $\alpha,\beta$-unsaturated nitriles may be selected from the group consisting of acrylonitrile, methacrylonitrile, ethacrylonitrile and mixtures thereof. In an embodiment the $C_3$-$C_5$ $\alpha,\beta$-unsaturated nitrile is acrylonitrile.

In an embodiment, the copolymer comprises from about 40 to about 85 weight percent of conjugated diene units and from about 15 to about 60 weight percent of unsaturated nitrile units. In another embodiment, the copolymer comprises from about 60 to about 75 weight percent of conjugated diene units and from about 25 to about 40 weight percent of unsaturated nitrile units. In still another embodiment, the copolymer comprises from about 60 to about 70 weight percent of conjugated diene units and from about 30 to about 40 weight percent of unsaturated nitrile units.

As used herein, the terms hydrogenated nitrile rubber and unsaturated nitrile rubber may refer to either a single rubber or a blend of more than one rubber species.

Incorporating a suitable heat-resistant additive into the elastomeric composition embodiments can allow for blends having higher concentrations of NBR that sustain tolerable heat resistance, and the blends can be used in timing-belt applications. In particular, it has been discovered that the blend of heat-resistant additives contained in the compound sold under the trademark THERBAN HT (THERBAN HT VP KA8805), available from Lanxess Corporation, can be used to manufacture elastomeric compositions having relatively higher concentrations of unsaturated NBR while preserving suitable heat resistance of the overall composition. THERBAN HT is a blend of hydrogenated butadiene acrylonitrile copolymer and heat-resistant agents. The heat-resistant agents make up approximately 47 weight % of the THERBAN HT additive, while the copolymer makes up approximately 53 weight % of the THERBAN HT composition. THERBAN HT is described in further detail in Lanxess Deutschland GmbH Product Data Sheet "THERBAN HT VP KA8805" (Dec. 2, 2004) & Lanxess technical information sheet entitled "THERBAN HT." However, the specific THERBAN HT heat-resistant agents are proprietary. In an embodiment, known heat-resistant agents can be used in place of the THERBAN HT heat-resistant agents. It will be recognized that the heat-resistant agents in THERBAN HT, if introduced into the HNBR/unsaturated nitrile rubber composition embodiments apart from the THERBAN HT copolymer are likely to afford the same heat-resistant benefits to the HNBR/unsaturated nitrile rubber elastomeric compositions as the THERBAN HT additive.

It will be understood that the amount of THERBAN HT added to the composition will impact the total amount of HNBR in the composition. In the Examples below, the addition of 15 phr of THERBAN HT additive contributes approximately 8 phr (53 weight %) of HNBR rubber to the composition and 7 phr (47 weight %) of the proprietary blend of heat-resistant agents. Thus, unless otherwise indicated when referring herein to the amount of HNBR in a composition, the amount of HNBR will be understood as the total amount of HNBR in the composition regardless of the source. In a similar manner, when referring to the amount of heat-resistant additive or heat-resistant additive of THERBAN HT, these amounts will be understood to be referring only to the total amount of heat-resistant agents in the subject composition. In an embodiment, the amount of heat-resistant additive refers to the amount of heat-resistant agents in THERBAN HT.

In addition to the HNBR, unsaturated nitrile rubber, and heat-resistant additive described above, the elastomeric composition embodiments may include from 0.1 phr to about 250 phr, and in other embodiments, from about 10 phr to about 200 phr, and in still other embodiments, from about 30 phr to about 150 phr, of conventional carbon black. Non-limiting representative examples of carbon blacks that may be used individually or in combination include those known by their ASTM designations N110, N121, N242, N293, N299, S315, N326, N330, M332, N339, N343, N347, N351, N358, N375, N550, N582, N630, N624, N650, N660, N683, N754, N762, N907, N908, N990, and N991.

The elastomeric composition embodiments may further comprise from 0.1 phr to about 100 phr of non-carbon black reinforcing fillers and/or reinforcing agents. And, amounts above 100 phr may also be used. Examples of reinforcing agents are silica, talc, calcium carbonate and the like. In an embodiment, about 1 to about 30 phr of non-carbon black reinforcing agents may be used in the elastomeric composition.

The elastomeric composition embodiments may include amounts of processing aids, which may comprise from about 0.1 phr to about 50 phr. Processing aids may include, for example, ester & polyester plasticizers, polyethylene glycol, naphthenic and/or paraffinic processing oils. Furthermore, the elastomeric composition embodiments may include suitable amounts of antioxidants, ranging from about 1 phr to about 25 phr. However, concentrations above 25 phr may be used. Representative antioxidants include (zinc)2-mercaptotolylimidazole, alkylated diphenylamines, N-alkylated phenylenediamines, phenyl-.alpha.-naphthylamine, alkylated phenyl-.alpha.-naphthylamine, dimethyl quinolines, trimethyldihydroquinolines and oligomeric compositions derived therefrom, hindered phenolics, alkylated hydroquinones, hydroxylated thiodiphenyl ethers, alkylidenebisphenols, thiopropionates, metallic dithiocarbamates, 1,3,4-dimercaptothiadiazole and derivatives, oil soluble copper compounds, and the like.

The elastomeric composition embodiments may further comprise metal oxides, including zinc oxide. In one embodiment, from 0.1 to about 25 phr of metal oxide may be used in the composition. However, concentrations above 25 phr may be used. Still other compounds that may be included in the elastomeric composition embodiments include adhesion promoters, which may include metallic diacrylates, such as anhydrous zinc diacrylate, metallic monomethacrylate monomers, trifunctional acrylate monomers, monofunctional acid esters, and trifunctional acid esters. Adhesion promoters may be used in amounts ranging from 0 phr to about 15 phr. Amounts above 15 phr may also be used. Further, elastomeric composition embodiments may comprise plasticizers ranging from about 0.1 phr to about 100 phr. Amounts above 100 phr may also be used. Non-limiting representative examples of useful plasticizers include dioctyl sebacate, chlorinated paraffins; however, a variety of other suitable plasticizers are known in the art and may be used. Fatty acids, which can include stearic acid, can make up from about 0.5 phr to about 5 phr of the elastomeric composition. Waxes can make up from about 0.1 phr to about 15 phr of the elastomeric composition. In an embodiment, microcrystalline and paraffin waxes may be used.

A sulfur cure system may be employed to cure the subject elastomeric compositions. Alternatively, in order to maximize the resistance of the vulcanizate to air aging at elevated temperatures and to counteract the reduction in heat resistance attendant the addition of NBR to the elastomeric compositions, a free radical crosslinking reaction using a free-radical promoting material can be used to cure the elastomeric compositions. In an embodiment, the reaction may be cured using a peroxide cure system. Well-known classes of organic peroxides that may be used as free-radical promoting substances include diacyl peroxides, peroxyesters, dialkyl peroxides and peroxyketals. More specific examples include dicumyl peroxide, n-butyl-4,4-di(t-butylperoxy)valerate, 1,1-di(t-butylperoxy)-3,3,5-trimethylcyclohexane, 1,1-di(t-butylperoxy)cyclohexane, 1,1-di(t-amylperoxy)cyclohexane, ethyl-3,3-di(t-butylperoxy)butyrate, ethyl-3,3-di(t-amylperoxy)butyrate, 2,5-dimethyl-2,5-di(t-butylperoxy)hexane, t-butyl cumyl peroxide, .alpha.,.alpha.'-bis(t-butylperoxy)diisopropylbenzene, di-t-butyl peroxide, 2,5-dimethyl-2,5-di(t-butylperoxy)hexyne-3, t-butyl perbenzoate, 4-methyl-4-t-butylperoxy-2-pentanone and mixtures thereof. Typical amounts of peroxide range from about 0.1 to about 12 phr (based on active parts of peroxide). In another embodiment, the amount of peroxide may range from about 0.5 to about 7 phr.

A peroxide coagent may be added as part of the free-radical crosslinking reaction. Coagents are typically monofunctional and polyfunctional unsaturated organic compounds which are used in conjunction with the free-radical initiators to achieve improved vulcanization properties. Useful co-agents include 1,2-polybutadienes, organic acrylates, organic methacrylates, metal salts of an alpha, beta-unsaturated organic acid and mixtures thereof. Representative examples of acrylates and methacrylates coagents include di-, tri-, tetra- and penta-functional acrylates, di-, tri-, tetra- and penta-functional methacrylates and mixtures thereof. Specific examples of such coagents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropylene glycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris(2-hydroxy ethyl)isocyanurate triacrylate, tris(2-hydroxy ethyl)isocyanurate triacrylate, and tris(2-hydroxy ethyl)isocyanurate trimethacrylate.

The metal salts of .alpha., .beta.-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum.

Suitable co-agent may be used in amounts ranging from about 0.1 phr to about 15 phr, and in other embodiments from about 2 to about 10 phr, and in still further embodiments, from about 4 to about 8 phr. In one embodiment, the co-agent may be trimethylolproprane trimethacrylate (TMPTMA). In another embodiment, the co-agent may be a metallic diacrylate such as SR633 sold by SARTOMER.

It is believed that areas of high NBR concentration within the elastomeric compositions may subject the elastomeric compositions to ozone attack followed by chain scission. Therefore, the elastomeric compositions may comprise from 0.1 about to about 10 phr of a suitable antiozonant. Antiozonants are well known in the art and a non-limiting list of useful antioxidants includes substituted paraphenylenediamines, cyclic acetals, and enol ethers.

Alternatively, or in combination with the inclusion of antiozonants, methods for blending the unsaturated nitrile rubber and HNBR and other components of the inventive elastomeric compositions may be selected to reduce areas of high unsaturated nitrile rubber concentration in the composition and encourage greater distribution of NBR throughout the composition. According to a first method of blending, which may be referred to as the polymer premix method of blending, the unsaturated nitrile rubber and HNBR portions may be blended together first in a suitable mixer, which may be a mill, an internal mixer, extruder or the like, simultaneously with or followed thereafter by the addition into the chamber of other ingredients, such as carbon black and the heat-resistant additive. Alternatively, a Y-mix method of blending may be followed. In the Y-mix method, all or portions of selected ingredients, including carbon black, antiozonants, antioxidants, fillers, process aids, waxes, adhesion promoters, metal oxides, heat-resistant additives and the like, in amounts described herein, may be added to and blended with each of the HNBR and unsaturated nitrile rubber portions separately to create an HNBR non-productive stage and an NBR non-productive stage. Thereafter, the HNBR and NBR non-productive stages may be blended together in a third mixing pass. Curative(s), as previously described, may be added in a fourth or final mix pass to make a productive compound. To optimize air aging & ozone resistance, the THERBAN HT may be preferentially added in the HNBR non-productive mix stage. The remaining antiozonants & waxes may be preferentially added in the NBR non-productive mix stage. The carbon black, as with the other additives, may be split between the HNBR non-productive stage and the NBR non-productive stage.

It is noted, that while the polymer premix and Y-mix methods may be employed, a standard 1 or 2-stage mixing method, which is well known in the art may be used as well. Examples of Y-mix and polymer premix compositions are further described and elucidated in the experimental data. The apparatuses (i.e., chambers) used in mixing elastomeric compositions are well known in the art and are not further described herein, but may include a mixer, such as a BANBURY mixer, a mill, or an extruder.

The following experimental data is submitted for the purpose of further illustrating the nature of the inventive embodiments and are not intended as a limitation on the scope thereof.

Experiment 1

A first experiment was conducted to determine the amount of unsaturated nitrile rubber that could be blended with HNBR before an unsuitable reduction in material properties resulted. In the experiment, NBR was blended at 0, 25, and 50 phr into HNBR with two levels of carbon black. Heat resistant additive was not included. Table 1 illustrates the recipes of Experiment 1.

TABLE 1

| (Data in table is phr) | Mix 1 | Mix 2 | Mix 3 | Mix 4 | Mix 5 | Mix 6 |
| --- | --- | --- | --- | --- | --- | --- |
| HNBR[1] | 100 | 75 | 50 | 100 | 75 | 50 |
| Fatty Acid[2] | 1 | 1 | 1 | 1 | 1 | 1 |
| Metal Oxide[3] | 5 | 5 | 5 | 5 | 5 | 5 |
| Antioxidant[4] | 2 | 2 | 2 | 2 | 2 | 2 |
| Antioxidant[5] | 2 | 2 | 2 | 2 | 2 | 2 |
| Co-Agent[6] | 8 | 8 | 8 | 8 | 8 | 8 |
| Plasticizer[7] | 5 | 5 | 5 | 5 | 5 | 5 |
| Carbon Black[8] | 35 | 35 | 35 | 45 | 45 | 45 |
| Carbon Black[9] | 75 | 75 | 75 | 90 | 90 | 90 |
| NBR[10] |  | 25 | 50 |  | 25 | 50 |
| Peroxide[11] | 4 | 4 | 4 | 4 | 4 | 4 |

[1]ZETPOL 2020L supplied by Zeon Chemicals
[2]EMERY 400 STEARIC supplied by Henkel
[3]KADOX 720C supplied by Horsehead Corp
[4]VANOX ZMTI supplied by RT Vanderbilt
[5]AGERITE RESIN D supplied by RT Vanderbilt
[6]SR633 supplied by Sartomer
[7]PLASTALL TOTM supplied by CP Hall
[8]HUBER N990 supplied by Huber Corp
[9]STERLING NS-1 supplied by Cabot Corp
[10]Nysyn 30-5 supplied by Zeon Chemicals
[11]Dicup 70% supplied by Struktol Corp Measurements of physical properties obtained from the six compositions of Experiment 1 is reproduced in Table 2 below. The data in Table 2 demonstrates that increasing the amount of NBR increased unaged Shore A hardness, aged hardness, and improved compression set, but generally reduced resistance to long term air aging.

TABLE 2

|  |  | Mix 1 | Mix 2 | Mix 3 | Mix 4 | Mix 5 | Mix 6 |
|---|---|---|---|---|---|---|---|
| MDR 30/340° F. ASTM D5289 | | | | | | | |
| TestTemp | [° F.] | 340 | 340 | 339.9 | 339.9 | 340 | 340 |
| TestTime | [min] | 30 | 30 | 30 | 30 | 30 | 30 |
| ML | [dNm] | 1.71 | 3.03 | 2.63 | 3.42 | 4.64 | 4.72 |
| MH | [dNm] | 28.81 | 40.71 | 48.69 | 33.34 | 44.34 | 56.8 |
| Ts1 | [min] | 0.31 | 0.27 | 0.28 | 0.29 | 0.27 | 0.25 |
| T90 | [min] | 5.44 | 5.96 | 6.04 | 5.4 | 5.72 | 5.72 |
| S'@t90 | [dNm] | 26.09 | 36.92 | 44.09 | 30.35 | 40.37 | 51.6 |
| Rh | [dNm/min] | 18.54 | 23.85 | 27.43 | 23.14 | 24.64 | 32.66 |
| Hardness °Shore A ASTM D2240 Press/Sheet/30.0 min./340° F. | | | | | | | |
| Hardness | [° Sh.A] | 86 | 89 | 90 | 89 | 91 | 92 |
| Hardness 72.0 hour/266° F. | [° Sh.A] | 88 | 91 | 93 | 90 | 94 | 94 |
| Hardness 168.0 hour/266° F. | [° Sh.A] | 90 | 94 | 95 | 92 | 96 | 97 |
| Hardness 72.0 hour/284° F. | [° Sh.A] | 89 | 92 | 95 | 90 | 95 | 96 |
| Hardness 168.0 hour/284° F. | [° Sh.A] | 92 | 96 | 97 | 93 | 97 | 97 |
| Tensile test T10 ASTM D412 Press/Sheet/30.0 min./340° F. | | | | | | | |
| PeakStress | [psi] | 2858.3 | 2726.5 | 2684.6 | 2949.4 | 2688.3 | 2714.4 |
| PeakStrain | [%] | 220 | 136 | 91 | 168 | 109 | 74 |
| BreakStres | [psi] | 2856.7 | 2705.4 | 2651.5 | 2936.7 | 2657.5 | 2679.6 |
| Elongation | [%] | 219 | 134 | 89 | 166 | 106 | 72 |
| Hot air aging 72.0 hour/266° F. | | | | | | | |
| PeakStress | [psi] | 3160.7 | 3046 | 2793.9 | 3247.1 | 3003.1 | 2797.2 |
| PeakStress | [%Retention] | 110.60% | 111.70% | 104.10% | 110.10% | 111.70% | 103.10% |
| PeakStrain | [%] | 189 | 114 | 71 | 144 | 92 | 58 |
| PeakStrain | [% Retention] | 85.90% | 83.80% | 78.00% | 85.70% | 84.40% | 78.40% |
| BreakStres | [psi] | 3155.5 | 3015.2 | 2736.3 | 3222.3 | 2952.5 | 2752.1 |
| BreakStres | [% Retention] | 110.50% | 111.50% | 103.20% | 109.70% | 111.10% | 102.70% |
| Elongation | [%] | 187 | 113 | 68 | 142 | 90 | 56 |
| Elongation | [% Retention] | 85.40% | 84.30% | 76.40% | 85.50% | 84.90% | 77.80% |
| Hot air aging 72.0 hour/284° F. | | | | | | | |
| PeakStress | [psi] | 3286.2 | 2672.2 | 2510.5 | 3098.7 | 2514.7 | 2278.9 |
| PeakStress | [% Retention] | 115.00% | 98.00% | 93.50% | 105.10% | 93.50% | 84.00% |
| PeakStrain | [%] | 154 | 83 | 49 | 113 | 58 | 32 |
| PeakStrain | [% Retention] | 70.00% | 61.00% | 53.80% | 67.30% | 53.20% | 43.20% |
| BreakStres | [psi] | 3268.2 | 2629.7 | 2419.8 | 3055.4 | 2478 | 2175.4 |
| BreakStres | [% Retention] | 114.40% | 97.20% | 91.30% | 104.00% | 93.20% | 81.20% |
| Elongation | [%] | 152 | 81 | 47 | 111 | 56 | 30 |
| Elongation | [% Retention] | 69.40% | 60.40% | 52.80% | 66.90% | 52.80% | 41.70% |
| Hot air aging 168.0 hour/266° F. | | | | | | | |
| PeakStress | [psi] | 3395.7 | 2722 | 3070.9 | 3228.4 | 2905.3 | 2865 |
| PeakStress | [% Retention] | 118.80% | 99.80% | 114.40% | 109.50% | 108.10% | 105.50% |
| PeakStrain | [%] | 166 | 82 | 62 | 111 | 69 | 44 |
| PeakStrain | [% Retention] | 75.50% | 60.30% | 68.10% | 66.10% | 63.30% | 59.50% |
| BreakStres | [psi] | 3385.6 | 2678.2 | 3014 | 3189.5 | 2848.4 | 2816.6 |
| BreakStres | [% Retention] | 118.50% | 99.00% | 113.70% | 108.60% | 107.20% | 105.10% |
| Elongation | [%] | 163 | 80 | 59 | 109 | 67 | 42 |
| Elongation | [% Retention] | 74.40% | 59.70% | 66.30% | 65.70% | 63.20% | 58.30% |
| Hot air aging 168.0 hour/284° F. | | | | | | | |
| PeakStress | [psi] | 3192 | 2251.4 | 1727.1 | 2839.2 | 2661.9 | 1566.2 |
| PeakStress | [% Retention] | 111.70% | 82.60% | 64.30% | 96.30% | 99.00% | 57.70% |
| PeakStrain | [%] | 109 | 45 | 15 | 77 | 42 | 11 |
| PeakStrain | [%Retention] | 49.50% | 33.10% | 16.50% | 45.80% | 38.50% | 14.90% |
| BreakStres | [psi] | 3141.7 | 2194 | 1576.5 | 2783.5 | 2616.7 | 1393.8 |
| BreakStres | [%Retention] | 110.00% | 81.10% | 59.50% | 94.80% | 98.50% | 52.00% |
| Elongation | [%] | 107 | 43 | 13 | 74 | 40 | 10 |
| Elongation | [% Retention] | 48.90% | 32.10% | 14.60% | 44.60% | 37.70% | 13.90% |
| T10 Cord Peel Adhesion Fiberglass Cord ASTM D413 Cure 30.0 min./340° F. | | | | | | | |
| Peak Peel | [pli] | 41 | 27 | 24 | 30 | 27 | 22 |
| Avg. Peel | [pli] | 34 | 25 | 17 | 27 | erratic | 18 |

TABLE 2-continued

|  |  | Mix 1 | Mix 2 | Mix 3 | Mix 4 | Mix 5 | Mix 6 |
|---|---|---|---|---|---|---|---|
| Compression Set 70 h/275 F./25% Norm ASTM D395 Block Cure 45.0 min./340° F. | | | | | | | |
| Comp. set | [%] | 70.1 | 66.1 | 64 | 73.3 | 72.7 | 63.9 |

Experiment 2

In Experiment 2, two different HNBR compounds (trademarks THERBAN VP KA8844 and ZETPOL 2020L) were diluted with NBR in the presence and absence of the heat resistant additive THERBAN HT and in the presence and absence of an antioxidant blend (trade names VANOX ZMTI and AGERITE RESIN D). Table 3 illustrates the recipes of Experiment 3. It is again noted that the use of THERBAN HT contributed to the total amount of HNBR. Specifically, 15 parts of THERBAN HT contributes 8 parts of HNBR to the total composition.

TABLE 3

| (Data in table is phr) | Mix 7 | Mix 8 | Mix 9 | Mix 10 | Mix 11 | Mix 12 |
|---|---|---|---|---|---|---|
| HNBR[12] | 75 | 67 | 67 | | | |
| NBR[10] | 25 | 25 | 25 | 25 | 25 | 25 |
| Antioxidant[4] | 2 | | 2 | 2 | | 2 |
| Antioxidant[5] | 2 | | 2 | 2 | | 2 |
| Metal Oxide[3] | 5 | 5 | 5 | 5 | 5 | 5 |
| Metal Oxide/Process Oil[13] | 5 | 5 | 5 | 5 | 5 | 5 |
| Co-Agent[6] | 8 | 8 | 8 | 8 | 8 | 8 |
| Plasticizer[7] | 5 | 5 | 5 | 5 | 5 | 5 |
| Carbon Black[8] | 35 | 35 | 35 | 35 | 35 | 35 |
| Carbon Black[9] | 75 | 75 | 75 | 75 | 75 | 75 |
| Heat Resistant Agent[14] | | 15 | 15 | | 15 | 15 |
| HNBR[1] | | | | 75 | 67 | 67 |
| Peroxide[11] | 4 | 4 | 4 | 4 | 4 | 4 |

[12]THERBAN VP KA8844 supplied by Lanxess
[13]PLASTOMAG 170 supplied by Akrochem
[14]THERBAN HT supplied by Lanxess Measurements of physical properties obtained from the six compositions of Experiment 2 is reproduced in Table 4 below. It is demonstrated that a significant improvement in physical property retention following air aging was achieved using THERBAN HT in combination with the antioxidant blend.

TABLE 4

|  |  | Mix 7 | Mix 8 | Mix 9 | Mix 10 | Mix 11 | Mix 12 |
|---|---|---|---|---|---|---|---|
| MDR 30/340° F. ASTM D5289 | | | | | | | |
| TestTemp | [° F.] | 339.9 | 340 | 340 | 340 | 340 | 340 |
| TestTime | [min] | 30 | 30 | 30 | 30 | 30 | 30 |
| ML | [dNm] | 2.9 | 2.74 | 2.35 | 2.46 | 2.33 | 2.16 |
| MH | [dNm] | 37.85 | 35.45 | 30.57 | 42.32 | 40.15 | 33.71 |
| Ts1 | [min] | 0.34 | 0.33 | 0.38 | 0.35 | 0.37 | 0.4 |
| T90 | [min] | 5.99 | 6.01 | 6.1 | 6.81 | 6.51 | 7.01 |
| S'@t90 | [dNm] | 34.34 | 32.17 | 27.74 | 38.33 | 36.37 | 30.55 |
| Rh | [dNm/min] | 16.45 | 15.13 | 11.94 | 16.05 | 15.34 | 10.64 |
| Hardness °Shore A ASTM D 2240 Press/Sheet 30.0 min./340° F. | | | | | | | |
| Hardness | [°Sh.A] | 88 | 86 | 87 | 88 | 87 | 86 |
| Hardness 72.0 hour/266° F. | [°Sh.A] | 91 | 90 | 91 | 91 | 91 | 90 |
| Hardness 72.0 hour/284° F. | [°Sh.A] | 93 | 92 | 92 | 93 | 91 | 91 |
| Hardness 168.0 hour/266° F. | [°Sh.A] | 93 | 92 | 92 | 93 | 92 | 91 |
| Hardness 168.0 hour/284° F. | [°Sh.A] | 94 | 93 | 93 | 94 | 93 | 93 |
| Tensile test T10 ASTM D412 Press/Sheet 30.0 min./340° F. | | | | | | | |
| PeakStress | [psi] | 2642.8 | 2451.2 | 2359.6 | 2832.1 | 2518.8 | 2556.4 |
| PeakStrain | [%] | 139 | 142 | 153 | 136 | 141 | 156 |
| PreakStres | [psi] | 2625.7 | 2434.7 | 2345.4 | 2817.3 | 2501.7 | 2548.2 |
| Elongation | [%] | 137 | 140 | 151 | 134 | 139 | 153 |
| Hot air aging 72.0 hour/266° F. | | | | | | | |
| PeakStress | [psi] | 2845 | 2520.5 | 2591.5 | 3086.5 | 2522.1 | 2703.2 |
| PeakStress | [% Change] | 7.7% | 2.80% | 9.80% | 9.00% | 0.10% | 5.70% |
| PeakStrain | [%] | 118 | 123 | 147 | 121 | 122 | 156.5 |
| PeakStrain | [% Change] | −15.1% | −13.40% | −3.90% | −11.00% | −13.50% | 0.30% |
| BreakStres | [psi] | 2824.2 | 2498.6 | 2578.7 | 3062.1 | 2497.1 | 2690.7 |
| BreakStres | [% Change] | 7.6% | 2.60% | 9.90% | 8.70% | −0.20% | 5.60% |
| Elongation | [%] | 116 | 122 | 145 | 118 | 120 | 154.5 |
| Elongation Hot air aging | [% Change] | −15.3% | −12.90% | −4.00% | −11.90% | −13.70% | 1.00% |

TABLE 4-continued

|  |  | Mix 7 | Mix 8 | Mix 9 | Mix 10 | Mix 11 | Mix 12 |
|---|---|---|---|---|---|---|---|
| 72.0 hour/284° F. | | | | | | | |
| PeakStress | [psi] | 2324.6 | 2667.2 | 2722.6 | 2944.8 | 2695.6 | 2917.1 |
| PeakStress | [% Change] | −12.0% | 8.80% | 15.40% | 4.00% | 7.00% | 14.10% |
| PeakStrain | [%] | 66 | 112 | 133 | 97 | 108 | 142 |
| PeakStrain | [% Change] | −52.5% | −21.10% | −13.10% | −28.70% | −23.40% | −9.00% |
| BreakStres | [psi] | 2289 | 2639.7 | 2702.7 | 2903.9 | 2666.8 | 2898.1 |
| BreakStres | [%Change] | −12.8% | 8.40% | 15.20% | 3.10% | 6.60% | 13.70% |
| Elongation | [%] | 64 | 110 | 131 | 95 | 106 | 140 |
| Elongation | [% Change] | −53.3% | −21.40% | −13.20% | −29.10% | −23.70% | −8.50% |
| Hot air aging 168.0 hour/266° F. | | | | | | | |
| PeakStress | [psi] | 2751.3 | 2463.6 | 2072.1 | 2917 | 2652.7 | 2719.9 |
| PeakStress | [% Change] | 4.1% | 0.50% | −12.20% | 3.00% | 5.30% | 6.40% |
| PeakStrain | [%] | 95 | 104 | 81 | 95 | 109 | 128 |
| PeakStrain | [% Change] | −31.7% | −26.80% | −47.10% | −30.10% | −22.70% | −17.90% |
| BreakStres | [psi] | 2720 | 2435.4 | 2048.1 | 2881.8 | 2630.1 | 2701.1 |
| BreakStres | [% Change] | 3.6% | 0.00% | −12.70% | 2.30% | 5.10% | 6.00% |
| Elongation | [%] | 93 | 103 | 79 | 93 | 107 | 126 |
| Elongation | [% Change] | −32.1% | −26.40% | −47.70% | −30.60% | −23.00% | −17.60% |
| Hot air aging 168.0 hour/284° F. | | | | | | | |
| PeakStress | [psi] | 2156 | 2120.6 | 2624.5 | 3081.6 | 2567.3 | 2764.7 |
| PeakStress | [%Change] | −18.4% | −13.50% | 11.20% | 8.80% | 1.90% | 8.10% |
| PeakStrain | [%] | 50 | 64 | 111 | 94 | 97 | 116 |
| PeakStrain | [% Change] | −64% | −54.90% | −27.50% | −30.90% | −31.20% | −25.60% |
| BreakStres | [psi] | 2095.9 | 2094.1 | 2605.3 | 3040.2 | 2538.6 | 2738 |
| BreakStres | [% Change] | −20.2% | −14.00% | 11.10% | 7.90% | 1.50% | 7.40% |
| Elongation | [%] | 48 | 62 | 109 | 92 | 95 | 114 |
| Elongation | [% Change] | −65% | −55.70% | −27.80% | −31.30% | −31.70% | −25.50% |
| Compression Set 70 h/275 F./25% ASTM D395 Block Cure 45.0 min./340° F. | | | | | | | |
| Comp. set | [%] | 46.2 | 29.1 | 44.9 | 37.4 | 22 | 36.1 |

Experiment 3

In Experiment 3, different mixing methods were implemented to determine whether the mixing method impacted ozone resistance. In the polymer premix method (Premix), the HNBR and NBR were mixed together in a lab BANBURY mixer to 200° F. before addition of other ingredients. In the Y-mix method, portions of the non-elastomeric ingredients such as carbon black, waxes, antiozonants, and the like were added and mixed with each elastomer (HNBR and NBR) in separate mix passes. Carbon black was divided between the HNBR and NBR non-productive stages. The antiozonants and waxes were preferentially added to the NBR non-productive stage. The THERBAN HT was preferentially added to the HNBR non-productive stage. The resultant non-productive stages were then combined in another separate mix pass, wherein the blend was cured in the presence of a free radical promoting agent and peroxide coagent. The reference to a "standard" mixing process refers to a one pass process wherein all ingredients were added to the mixer at one time. In the same experiment, an evaluation of ozone resistance was made in the presence of chemical antiozonants (VULCAZON AFS/LG & VULCAZON AFD both supplied by Lanxess) with and without waxes present. Table 5 illustrates the seven mixes and the results of static ozone testing (50 pphm, 20% extension, 104 F, 72 hr.) This condition did not differentiate between the compounds on ozone resistance.

TABLE 5

|  | Mix 13 | Mix 14 | Mix 15 | Mix 16 | Mix 17 | Mix 18 | Mix 19 |
|---|---|---|---|---|---|---|---|
| Polymer Blend | HNBR | HNBR/NBR | HNBR/NBR | HNBR/NBR | HNBR/NBR | HNBR/NBR | HNBR/NBR |
| Polymer Ratio | 100 | 75/25 | 75/25 | 75/25 | 75/25 | 75/25 | 75/25 |
| Mix Method | Standard | Premix | Premix | Y-Mix | Y-Mix | Premix | Premix |
| Antiozonant | None | AFS/LG | AFS/LG-Wax | AFS/LG | AFS/LG-Wax | AFD | AFD-Wax |
| Condition | No cracks | 1 Jaw crack | No cracks | No cracks | No cracks | No cracks | No cracks |

Experiment 4

In Experiment 4, different mixing methods were again evaluated. The Y-mix method was compared to the polymer premix method and a conventional 2-stage method to determine whether the mixing method impacted ozone resistance. In the conventional 2-stage method, the first stage includes polymer blending, but without the polymer premix stage. Table 6 illustrates the 10 recipes and mix methods of Experiment 4.

TABLE 6

|  | Mix 20 | Mix 21 | Mix 22 | Mix 23 | Mix 24 | Mix 25 | Mix 26 | Mix 27 | Mix 28 | Mix 29 |
|---|---|---|---|---|---|---|---|---|---|---|
| MixType | 2-stage | 2-stage | 2-stage | 2-stage | Premix | Premix | Premix | Y-mix | Y-mix | Y-mix |
| HNBR[12] | 92 | 67 | 67 | 67 | 67 | 67 | 67 | 67 | 67 | 67 |
| Heat Resistant Agent[14] | 15 | 15 | 15 | 15 | 15 | 15 | 15 | 15 | 15 | 15 |
| Antioxidant[5] | 4 | 4 | 4 | 4 | 4 | 4 | 4 | 4 | 4 | 4 |
| Metal Oxide[3] | 15 | 15 | 15 | 15 | 15 | 15 | 15 | 15 | 15 | 15 |
| Metal Oxide/Process Oil[13] | 10 | 10 | 10 | 10 | 10 | 10 | 10 | 10 | 10 | 10 |
| Co-Agent[15] | 6.94 | 6.94 | 6.94 | 6.94 | 6.94 | 6.94 | 6.94 | 6.94 | 6.94 | 6.94 |
| Carbon Black[8] | 45 | 45 | 45 | 45 | 45 | 45 | 45 | 35 | 35 | 35 |
| Carbon Black[9] | 80 | 80 | 80 | 80 | 80 | 80 | 80 | 60 | 60 | 60 |
| Ground Calcium Carbonate[16] | 10 | 10 | 10 | 10 | 10 | 10 | 10 | 10 | 10 | 10 |
| Plasticizer[7] | 15 | 15 | 15 | 15 | 15 | 15 | 15 | 11 | 11 | 11 |
| NBR[10] |  | 25 | 25 | 25 | 25 | 25 | 25 |  |  |  |
| Antiozonant[17] |  |  | 4 | 4 |  | 4 | 4 |  |  |  |
| Refined Paraffin Wax[18] |  |  | 2.5 |  |  | 2.5 |  |  |  |  |
| Microcrystalline Wax[19] |  |  | 1.5 |  |  | 1.5 |  |  |  |  |
| NBR[10] |  |  |  |  |  |  |  | 25 | 25 | 25 |
| Carbon Black[8] |  |  |  |  |  |  |  | 10 | 10 | 10 |
| Carbon Black[9] |  |  |  |  |  |  |  | 20 | 20 | 20 |
| Plasticizer[7] |  |  |  |  |  |  |  | 4 | 4 | 4 |
| AntioZonant[17] |  |  |  |  |  |  |  |  | 4 | 4 |
| Refined Paraffin Wax[18] |  |  |  |  |  |  |  |  |  | 2.5 |
| Microcrystalline Wax[19] |  |  |  |  |  |  |  |  |  | 1.5 |
| Peroxide[11] | 4 | 3 | 3 | 3 | 3 | 3 | 3 | 3 | 3 | 3 |

[15]PLC (TMPTMA)-72 supplied by Rhein Chemie
[16]ALLIED A-1 supplied by Huber
[17]VULKAZON AFS/LG supplied by Lanxess
[18]Refined Paraffin Wax FO7959 supplied by International Waxes
[19]Microcrystalline Wax OK 1887H supplied by International Waxes Physical property measurements of the 10 recipes of Experiment 4 are disclosed in Table 7. The data in Tables 5 and 7 demonstrate that the ozone resistance of a static sample is influenced to an extent by the mix method used. A Y-mix method is preferred for improved ozone resistance for the elastomeric compositions of the present invention. Additionally, the use of antiozonant and wax may afford improved ozone resistance.

TABLE 7

|  |  | Mix 20 | Mix 21 | Mix 22 | Mix 23 | Mix 24 | Mix 25 | Mix 26 | Mix 27 | Mix 28 | Mix 29 |
|---|---|---|---|---|---|---|---|---|---|---|---|
| MDR 30/340° F. ASTM D5289 | | | | | | | | | | | |
| TestTemp | [° F.] | 339.9 | 339.9 | 340 | 340 | 340 | 340 | 340 | 339.9 | 339.9 | 339.9 |
| TestTime | [min] | 30 | 30 | 30 | 30 | 30 | 30 | 30 | 30 | 30 | 30 |
| ML | [dNm] | 1.15 | 1.59 | 1.37 | 1.15 | 1.48 | 1.3 | 1.16 | 1.34 | 1.28 | 1.07 |
| MH | [dNm] | 13.29 | 16.54 | 13.09 | 10.96 | 16.68 | 13.38 | 12.08 | 16.32 | 12.83 | 11.91 |
| Ts1 | [min] | 0.58 | 0.39 | 0.53 | 0.59 | 0.43 | 0.52 | 0.57 | 0.47 | 0.55 | 0.58 |
| T90 | [min] | 7.33 | 6.73 | 7.08 | 7.32 | 6.72 | 7.01 | 7.11 | 6.86 | 7 | 7.11 |
| S'@t90 | [dNm] | 12.08 | 15.03 | 11.92 | 9.98 | 15.16 | 12.18 | 10.98 | 14.79 | 11.68 | 10.83 |
| Rh | [dNm/min] | 3.26 | 6.37 | 4.4 | 3.66 | 5.99 | 4.54 | 3.83 | 5.54 | 4.12 | 3.7 |
| Hardness °Shore A ASTM D 2240 Press/Sheet/30.0 min./340° F. | | | | | | | | | | | |
| Hardness | [°Sh.A] | 81 | 84 | 82 | 81 | 84 | 80 | 80 | 82 | 81 | 80 |
| Hardness 72.0 hour/284° F. | [°Sh.A] | 85 | 89 | 89 | 87 | 90 | 87 | 89 | 89 | 89 | 87 |
| Hardness 168.0 hour/266° F. | [°Sh.A] | 84 | 88 | 89 | 88 | 89 | 88 | 88 | 89 | 88 | 88 |
| Tensile test T10 ASTM D412 Press/Sheet/30.0 min./340° F. | | | | | | | | | | | |
| PeakStress | [psi] | 1992.3 | 1744.5 | 1540.7 | 1395.1 | 1707.6 | 1532.4 | 1394.7 | 1755.9 | 1506.5 | 1473.9 |
| PeakStrain | [%] | 321 | 232 | 264 | 278 | 226 | 247 | 281 | 239 | 277 | 277 |
| BreakStres | [psi] | 1992.3 | 1739.2 | 1538.9 | 1393.2 | 1705.7 | 1532.4 | 1394.3 | 1752.1 | 1506.5 | 1471.9 |
| Elogation | [%] | 320 | 231 | 280 | 279 | 225 | 247 | 286 | 238 | 286 | 286 |
| Hot air aging 72.0 hour/284° F. | | | | | | | | | | | |
| PeakStress | [psi] | 2235.8 | 1961 | 1763.2 | 1693.5 | 1901.9 | 1893.9 | 1644.7 | 1968.8 | 1756.1 | 1771.6 |
| PeakStress | [% Change] | 12.20% | 12.40% | 14.40% | 21.40% | 11.40% | 23.60% | 18.00% | 12.10% | 16.60% | 20.20% |
| PeakStrain | [%] | 266 | 171 | 164 | 205 | 144 | 177 | 197 | 164 | 190 | 192 |
| PeakStrain | [% Change] | -17.10% | -26.30% | -37.90% | -26.30% | -36.30% | -28.30% | -29.90% | -31.40% | -31.40% | -30.70% |
| BreakStres | [psi] | 2235.8 | 1950.9 | 1756.2 | 1691.8 | 1889.5 | 1890.6 | 1642.9 | 1958.2 | 1752.5 | 1764.5 |
| BreakStres | [% Change] | 12.20% | 12.20% | 14.10% | 21.40% | 10.80% | 23.40% | 17.80% | 11.80% | 16.30% | 19.90% |

TABLE 7-continued

|  |  | Mix 20 | Mix 21 | Mix 22 | Mix 23 | Mix 24 | Mix 25 | Mix 26 | Mix 27 | Mix 28 | Mix 29 |
|---|---|---|---|---|---|---|---|---|---|---|---|
| Elongation | [%] | 268 | 169 | 162 | 204 | 142 | 176 | 194 | 162 | 188 | 190 |
| Elongation Hot air aging 168.0 hour/ 266° F. | [% Change] | −16.30% | −26.80% | −42.10% | −26.90% | −36.90% | −28.70% | −32.20% | −31.90% | −34.30% | −33.60% |
| PeakStress | [psi] | 2297.8 | 2002.7 | 2006.5 | 1790.8 | 2052.3 | 1813.7 | 1811.8 | 2066.7 | 1872 | 1908.5 |
| PeakStress | [% Change] | 15.30% | 14.80% | 30.20% | 28.40% | 20.20% | 18.40% | 29.90% | 17.70% | 24.30% | 29.50% |
| PeakStrain | [%] | 259 | 150 | 167 | 184 | 151 | 128 | 190 | 153 | 170 | 178 |
| PeakStrain | [% Change] | −19.30% | −35.30% | −36.70% | −33.80% | −33.20% | −48.20% | −32.40% | −36.00% | −38.60% | −35.70% |
| BreakStres | [psi] | 2295.8 | 1990.6 | 1995.8 | 1785.4 | 2043.3 | 1805 | 1809.8 | 2055.9 | 1866.4 | 1903.1 |
| BreakStres | [% Change] | 15.20% | 14.50% | 29.70% | 28.20% | 19.80% | 17.80% | 29.80% | 17.30% | 23.90% | 29.30% |
| Elongation | [%] | 265 | 148 | 165 | 183 | 148 | 126 | 188 | 151 | 168 | 176 |
| Elongation | [% Change] | −17.20% | −35.90% | −41.10% | −34.40% | −34.20% | −49.00% | −34.30% | −36.60% | −41.30% | −38.50% |
| Compression Set 70 h/275 F./25% ASTM D395 Block Cure 45.0 min./340° F. | | | | | | | | | | | |
| Comp. set | [%] | 47.9 | 52.1 | 51.9 | 51.4 | 48.9 | 53.7 | 49.6 | 51 | 50.8 | 47.7 |
| Press/Sheet/30.0 min./340° F. Ozone resistance, 50 pphm, 20%elong, 104 F., 72 hr | | | | | | | | | | | |
| Cracks present | | none | none | none | some | none | none | some worst in series | none | none best | some |

While certain representative embodiments and details have been shown for the purpose of illustrating the invention, it will be apparent to those skilled in this art that various changes and modifications may be made therein without departing from the spirit or scope of the invention.

We claim:

1. An elastomeric composition comprising:
   (A) from 60 to 67 parts per hundred rubber of a first hydrogenated acrylonitrile-butadiene rubber,
   (B) from 4 to 15 parts per hundred rubber of a heat resistant additive, and
   (C) from 25 to 40 parts per hundred rubber of unsaturated acrylonitrile-butadiene rubber;
   wherein the heat resistant additive is comprised of about 47 percent by weight of a heat resistant agent and about 53 percent by weight of a second hydrogenated acrylonitrile-butadiene rubber;
   wherein the first hydrogenated acrylonitrile-butadiene rubber is mixed with the heat resistant additive in a non-productive mixing stage before being mixed with the unsaturated acrylonitrile-butadiene rubber;
   wherein the elastomeric composition is cured after the addition of the unsaturated acrylonitrile-butadiene rubber using a free radical promoting material and a peroxide co-agent, wherein the free-radical promoting material is a peroxide selected from the group consisting of diacyl peroxides, peroxyesters, dialkyl peroxides and peroxyketals and is used in an amount from about 0.5 to about 7 parts per hundred rubber, and wherein the peroxide co-agent is selected from the group consisting of 1,2 polybutadienes, organic acrylates, organic methacrylates, metal salts of an alpha, beta-unsaturated organic acid and mixtures thereof and is used in an amount from about 2 to about 10 parts per hundred rubber; and
   wherein the elastomeric composition has an original elongation which is within the range of 140% to 153%, and a retained elongation after being heat aged for 72 hours at a temperature of 266° F. which is within the range of 87% to 96% of the original elongation.

2. The elastomeric composition of claim 1, further comprising: from 110 phr to 150 phr of a carbon black.

3. The elastomeric composition of claim 2, further comprising:
   from 1 to 4 phr of an antioxidant, selected from the group consisting of (zinc)2-mercaptotolylimidazole, alkylated diphenylamines, N-alkylated phenylenediamines, phenyl-α-naphthylamine, alkylated phenyl-α-naphthylamine, dimethyl quinolines, trimethyldihydroquinolines and oligomeric compositions derived therefrom, hindered phenolics, alkylated hydroquinones, hydroxylated thiodiphenyl ethers, alkylidenebisphenols, thiopropionates, metallic dithiocarbamates, 1,3,4-dimercaptothiadiazole and derivatives, and oil soluble copper compounds.

4. The elastomeric composition of claim 3, further comprising: from 0.1 to 4 phr of an antiozonant, selected from the group consisting of substituted paraphenylenediamines, cyclic acetals, and enol ethers.

5. The elastomeric composition of claim 1, wherein the peroxide coagent is TMPTMA.

6. The elastomeric composition of claim 1, further comprising:
   from 1 to 4 phr of an antioxidant, selected from the group consisting of (zinc)2-mercaptotolylimidazole, alkylated diphenylamines, N-alkylated phenylenediamines, phenyl-α-naphthylamine, alkylated phenyl-α-naphthylamine, dimethyl quinolines, trimethyldihydroquinolines and oligomeric compositions derived therefrom, hindered phenolics, alkylated hydroquinones, hydroxylated thiodiphenyl ethers, alkylidenebisphenols, thiopropionates, metallic dithiocarbamates, 1,3,4-dimercaptothiadiazole and derivatives, and oil soluble copper compounds.

7. The elastomeric composition of claim 1, further comprising:
   from 0.1 to 4 phr of an antiozonant, selected from the group consisting of substituted paraphenylenediamines, cyclic acetals, and enol ethers.

8. A timing belt, comprising:
   an inner facing toothed surface, wherein each tooth substantially extends across the width of the belt body for engaging an associated timing belt pulley;

a belt body;
the belt body being comprised of the cured elastomeric composition specified in claim 1.

9. The timing belt of claim 8, wherein the elastomeric composition further comprises: from 110 phr to 150 phr of a carbon black.

10. The timing belt of claim 8, further comprising:
from 1 to 4 phr of an antioxidant, selected from the group consisting of (zinc)2-mercaptotolylimidazole, alkylated diphenylamines, N-alkylated phenylenediamines, phenyl-α-naphthylamine, alkylated phenyl-α-naphthylamine, dimethyl quinolines, trimethyldihydroquinolines and oligomeric compositions derived therefrom, hindered phenolics, alkylated hydroquinones, hydroxylated thiodiphenyl ethers, alkylidenebisphenols, thiopropionates, metallic dithiocarbamates, 1,3,4-dimercaptothiadiazole and derivatives, and oil soluble copper compounds.

11. The timing belt of claim 8, further comprising:
from 0.1 to 4 phr of an antiozonant, selected from the group consisting of substituted paraphenylenediamines, cyclic acetals, and enol ethers.

\* \* \* \* \*